(12) United States Patent
Yao et al.

(10) Patent No.: US 8,485,050 B2
(45) Date of Patent: Jul. 16, 2013

(54) TORQUE SENSOR ASSEMBLY FOR A POWER-ASSISTED BICYCLE

(75) Inventors: Li-Ho Yao, Taipei (TW); Simon Fan, Hsinchu County (TW)

(73) Assignee: Li-Ho Yao, Taipei (TW)

( * ) Notice: Subject to any disclaimer, the term of this patent is extended or adjusted under 35 U.S.C. 154(b) by 98 days.

(21) Appl. No.: 13/306,167

(22) Filed: Nov. 29, 2011

(65) Prior Publication Data

US 2013/0086996 A1    Apr. 11, 2013

(30) Foreign Application Priority Data

Oct. 7, 2011   (TW) .............................. 100136387 A

(51) Int. Cl.
*G01L 3/02*      (2006.01)
(52) U.S. Cl.
USPC ...................................... 73/862.31; 73/862.08
(58) Field of Classification Search
USPC ............ 73/862.08, 862.31, 862.321, 862.322
See application file for complete search history.

(56) References Cited

U.S. PATENT DOCUMENTS

| | | | |
|---|---|---|---|
| 3,645,580 A * | 2/1972 | Spies | 301/55 |
| 4,446,746 A | 5/1984 | Aoshima | |
| 4,466,629 A * | 8/1984 | Sinyard | 280/279 |
| 4,577,531 A * | 3/1986 | Bergles | 192/217.4 |
| 5,014,560 A | 5/1991 | Hutchinson | |
| 5,829,546 A | 11/1998 | Tseng | |
| 5,941,333 A | 8/1999 | Sun | |
| 6,006,850 A | 12/1999 | Yu | |
| 6,263,993 B1 | 7/2001 | Lin | |
| 6,516,908 B2 | 2/2003 | Tseng | |
| 6,684,971 B2 | 2/2004 | Yu et al. | |
| 6,886,416 B2 * | 5/2005 | Tsay et al. | 73/862.321 |
| 7,814,803 B2 | 10/2010 | Akiyama et al. | |
| 7,845,243 B2 | 12/2010 | Poirier et al. | |
| 8,047,084 B2 | 11/2011 | Okuyama et al. | |
| 2005/0275561 A1 * | 12/2005 | Kolda et al. | 340/870.07 |
| 2010/0018345 A1 * | 1/2010 | Lanz | 74/594.1 |
| 2013/0086995 A1 * | 4/2013 | Yao et al. | 73/862.08 |

FOREIGN PATENT DOCUMENTS

| | | |
|---|---|---|
| JP | 1971002239 | 10/1971 |
| JP | 56117331 U | 9/1981 |
| JP | 57076428 A | 5/1982 |
| JP | 57157861 A | 9/1982 |
| JP | 58015135 A | 1/1983 |
| JP | H0550221 U | 7/1993 |
| JP | 7039314 A | 2/1995 |
| JP | 8230756 A | 9/1996 |
| JP | 8271358 A | 10/1996 |
| JP | 8313375 A | 11/1996 |
| JP | 2003252280 A | 9/2003 |
| TW | 322157 | 12/1997 |
| TW | 372072 | 10/1999 |
| TW | M410879 | 9/2011 |
| WO | WO-2009/054161 A1 | 4/2009 |

\* cited by examiner

*Primary Examiner* — Max Noori
(74) *Attorney, Agent, or Firm* — Ming Chow; Sinorica, LLC

(57) ABSTRACT

A torque sensor assembly for a power-assisted bicycle has a torque sensor, a one-way bearing, a chainwheel, two cranks and two pedals. The torque sensor has an envelope tube, a middle tube, a transmission axle, a resilient element connected to the middle tube and the transmission axle, a first disc and a second disc respectively attached to the transmission axle and the middle tube, and a detection unit detecting displacement angles of the second disc and the first disc to calculate torques applied to the transmission axle and to drive the power-assisted bicycle according to the torque. The torque sensor assembly has a simple structure, fast, sensitive and accurate torque sensing ability, and can easily be assembled to all kinds of power-assisted bicycles.

21 Claims, 13 Drawing Sheets

TORQUE SENSOR ASSEMBLY FOR A POWER-ASSISTED BICYCLE

BACKGROUND OF THE INVENTION

1. Field of the Invention

The present invention relates to a torque sensor assembly for a power-assisted bicycle, especially to a torque sensor assembly detecting torque applied by a rider. Then an electric motor drives the bicycle according to the torque detected and provides assisting power to overcome the drag caused by the terrain or any sort of load change by the rider or the bicycle.

2. Description of the Prior Art(s)

Beyond human-powered, a bicycle may also be powered by an electric motor which delivers auxiliary traction power to assist a rider, especially when the bicycle is riding up an upward terrain or when the rider is getting tired. A power-assisted bicycle that still requires the rider's pedaling for activating the electric motor is known as a "pedelec." To assure the rider's safety when riding the power-assisted bicycle, some countries have instituted rules and regulations to regulate use of the power-assisted bicycle, such as a travel speed and assisted power limits One conventional model is by detecting the wheel speed of the bicycle to determine when to switch on electric motor and start supplying the auxiliary traction power which also have multiple levels of assisted power options available. However, that sort of bicycle controller considers neither varying loads nor the rider's weight for estimation, which can always have the required assistance power miscalculated. Another model that determining the assisting power by various wheel speed presets is also often used for power-assisted bicycles on the market.

However, merely the wheel speed cannot necessarily reflect the correct required assisting power. That is, any preset motor power output without taking the actual load and rider's weight data for real-time regulations can never correctly reflect the true assisting power required.

To overcome the defects, the present invention provides a torque sensor assembly for a power-assisted bicycle to mitigate or obviate the aforementioned problems.

SUMMARY OF THE INVENTION

The main objective of the present invention is to provide a torque sensor assembly for a power-assisted bicycle, which is simple and accurate and can actually measure the torque applied by the rider and thus can reflect the true required assisting power in real-time. The torque sensor assembly has a torque sensor, a one-way bearing, a chainwheel, two cranks and two pedals. The torque sensor has an outer envelope tube, an inner middle tube coaxially mounted in the envelope tube, a transmission axle coaxially mounted through the middle tube, a resilient element mounted in-between and connected to the middle tube and the transmission axle, a first disc and a second disc respectively attached to the transmission axle and the middle tube, and a detection unit used to detecting shift angle difference between the second disc and the first disc to calculate the torque applied to the transmission axle. Accordingly, auxiliary motor power is applied to drive the bicycle. The torque sensor assembly has advantages such as a simple structure, fast response, and high and accurate sensitivity. The torque sensor assembly can be easily applied to convert an electric motor driven bicycle to an electric motor power-assisted bicycle.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
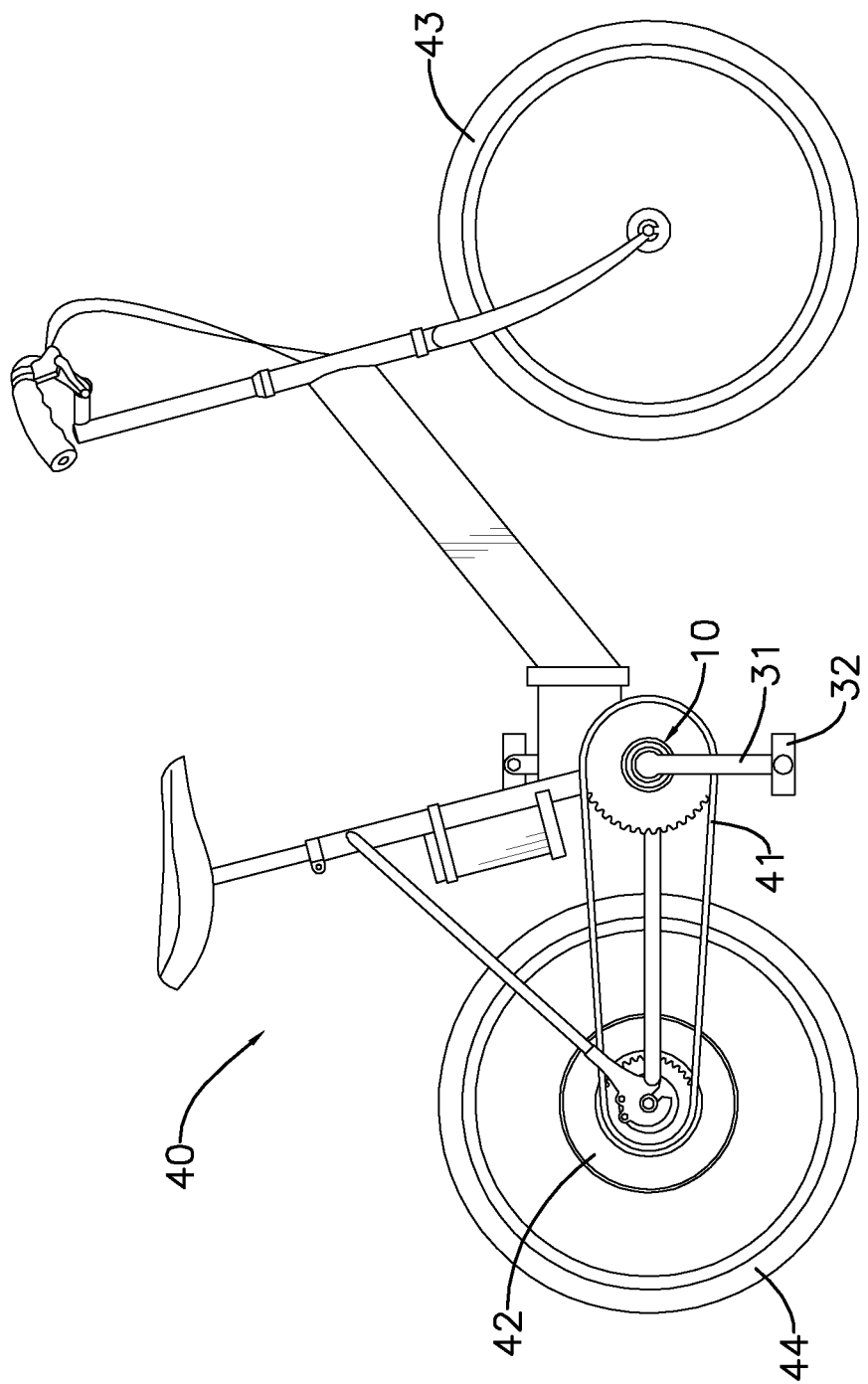
FIG. 1 is an operational side view of a torque sensor assembly for a power-assisted bicycle in accordance with the present invention, shown mounted on a power-assisted bicycle.
Figure 2:
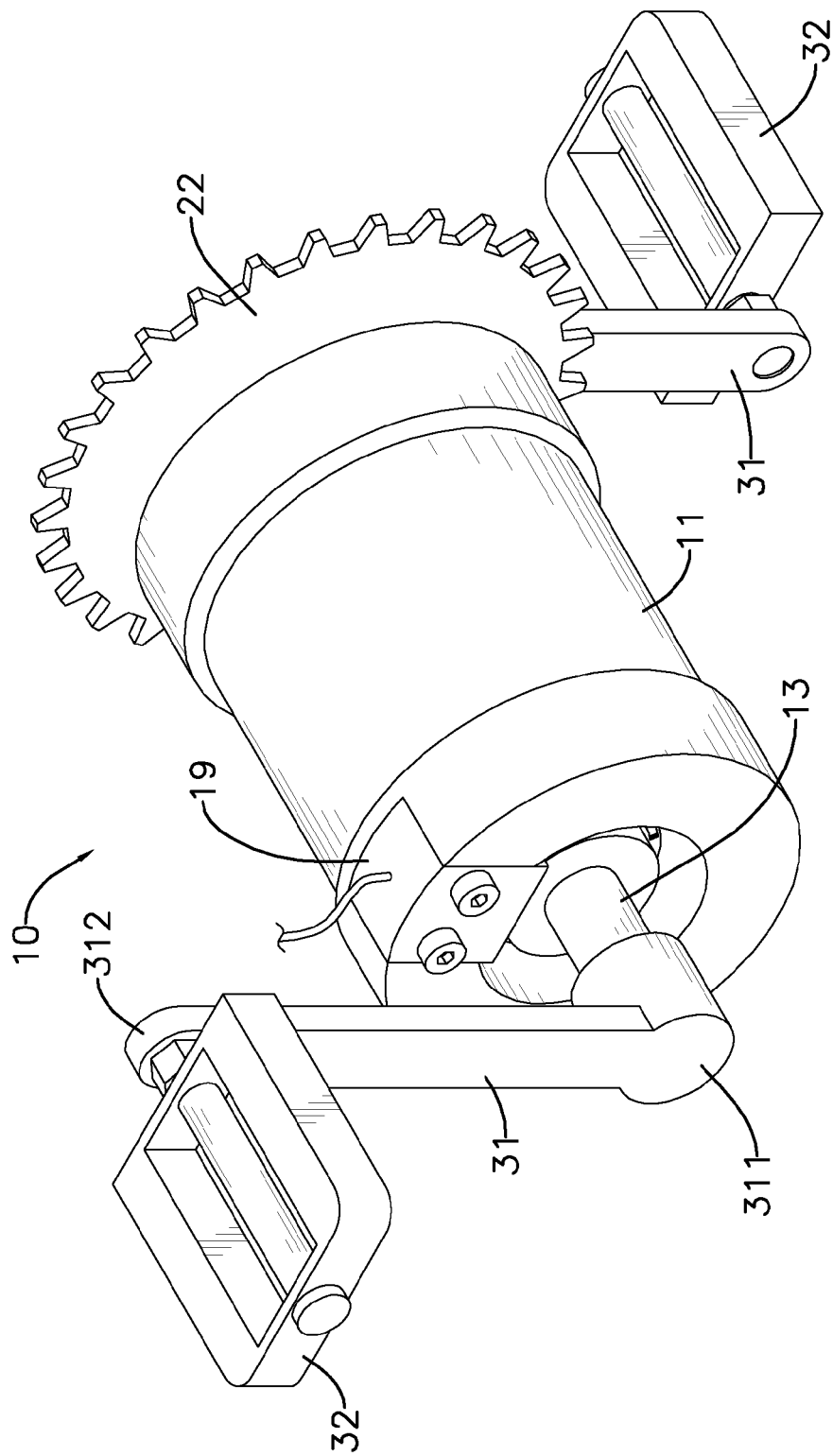
FIG. 2 is a perspective view of the torque sensor assembly in FIG. 1.
Figure 3:
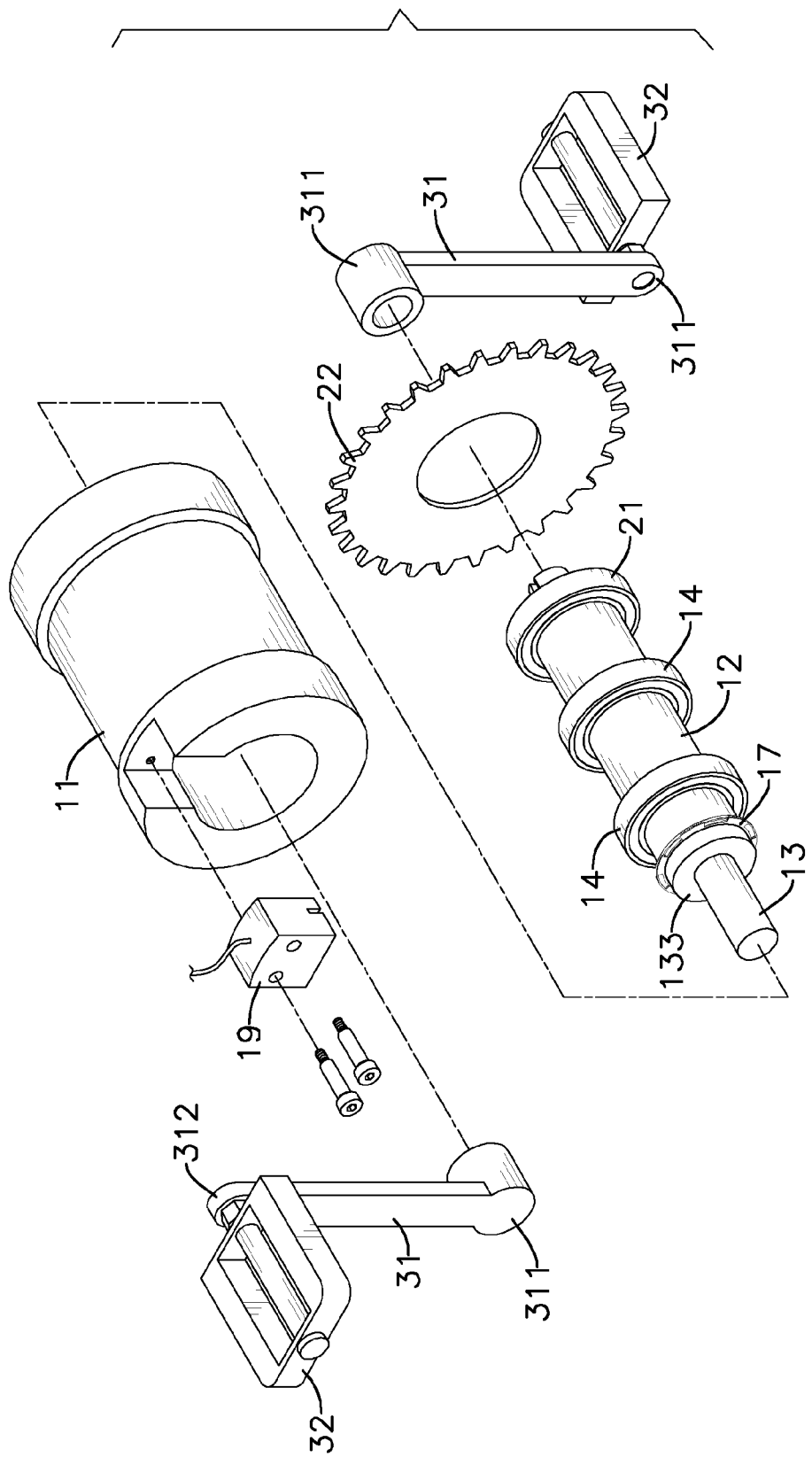
FIG. 3 is an exploded perspective view of the torque sensor assembly in FIG. 2.

With reference to FIG. 1, a torque sensor assembly for a power-assisted bicycle in accordance with the present invention is mounted in a bottom bracket of a power-assisted bicycle 40. With further reference to FIGS. 2 and 3, the torque sensor assembly comprises a torque sensor 10, a one-way bearing 21, a chainwheel 22, two cranks 31 and two pedals 32.

Figure 4:
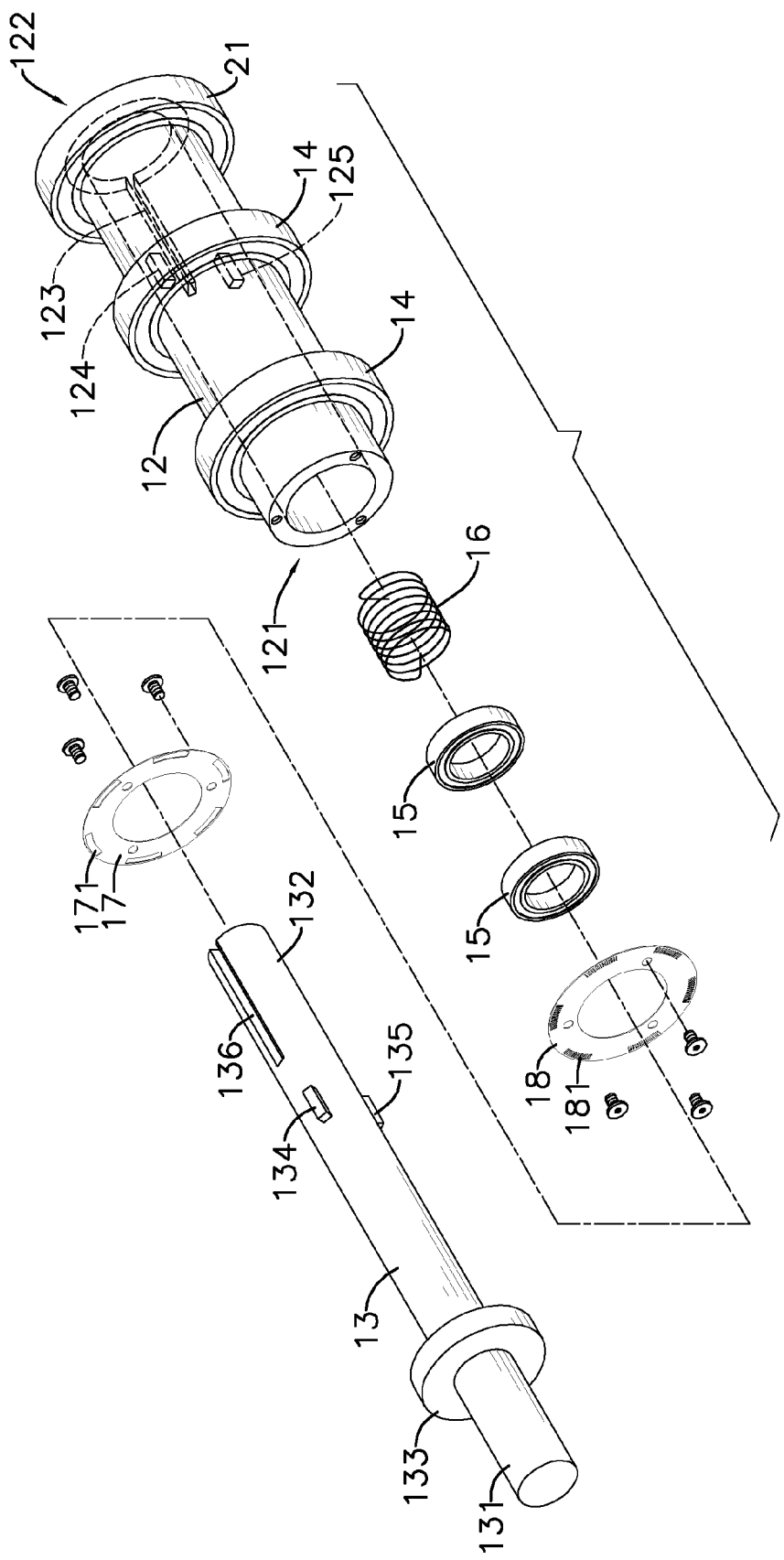
FIG. 4 is an enlarged exploded perspective view of the torque sensor assembly in FIG. 2.
Figure 11:
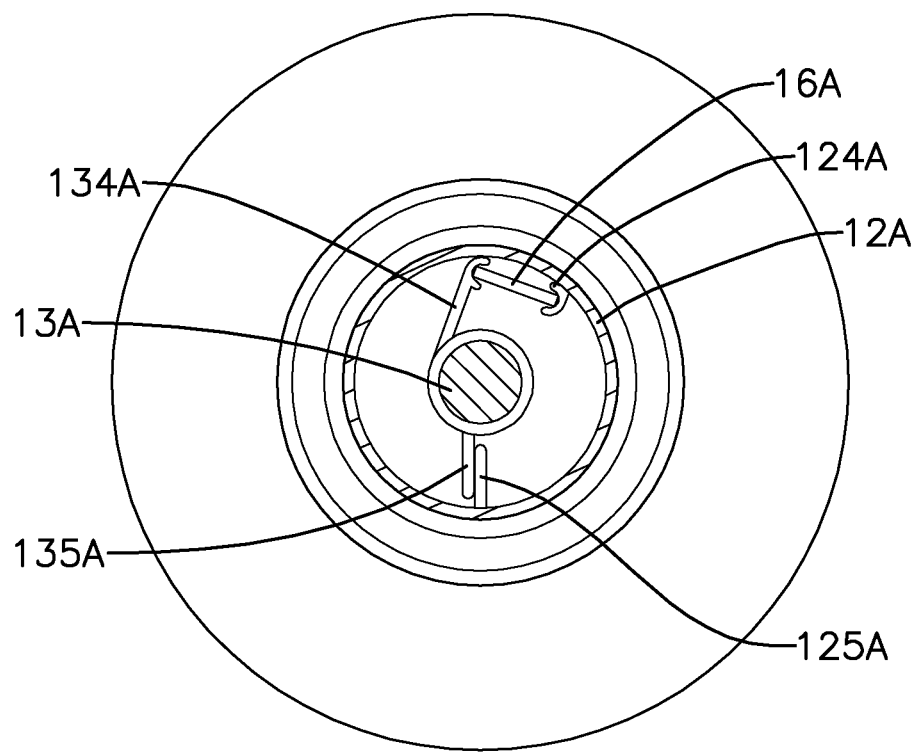
FIG. 11 is an end view in partial section of another embodiment of a torque sensor assembly for a power-assisted bicycle in accordance with the present invention.

With further reference to FIGS. 4 and 11, the torque sensor 10 has an envelope tube 11, a middle tube 12, 12A, a transmission axle 13, 13A, at least one outer bearing 14, at least one inner bearing 15, a resilient element 16, 16A, a first disc, a second disc and a detection unit 19.

Figure 6:
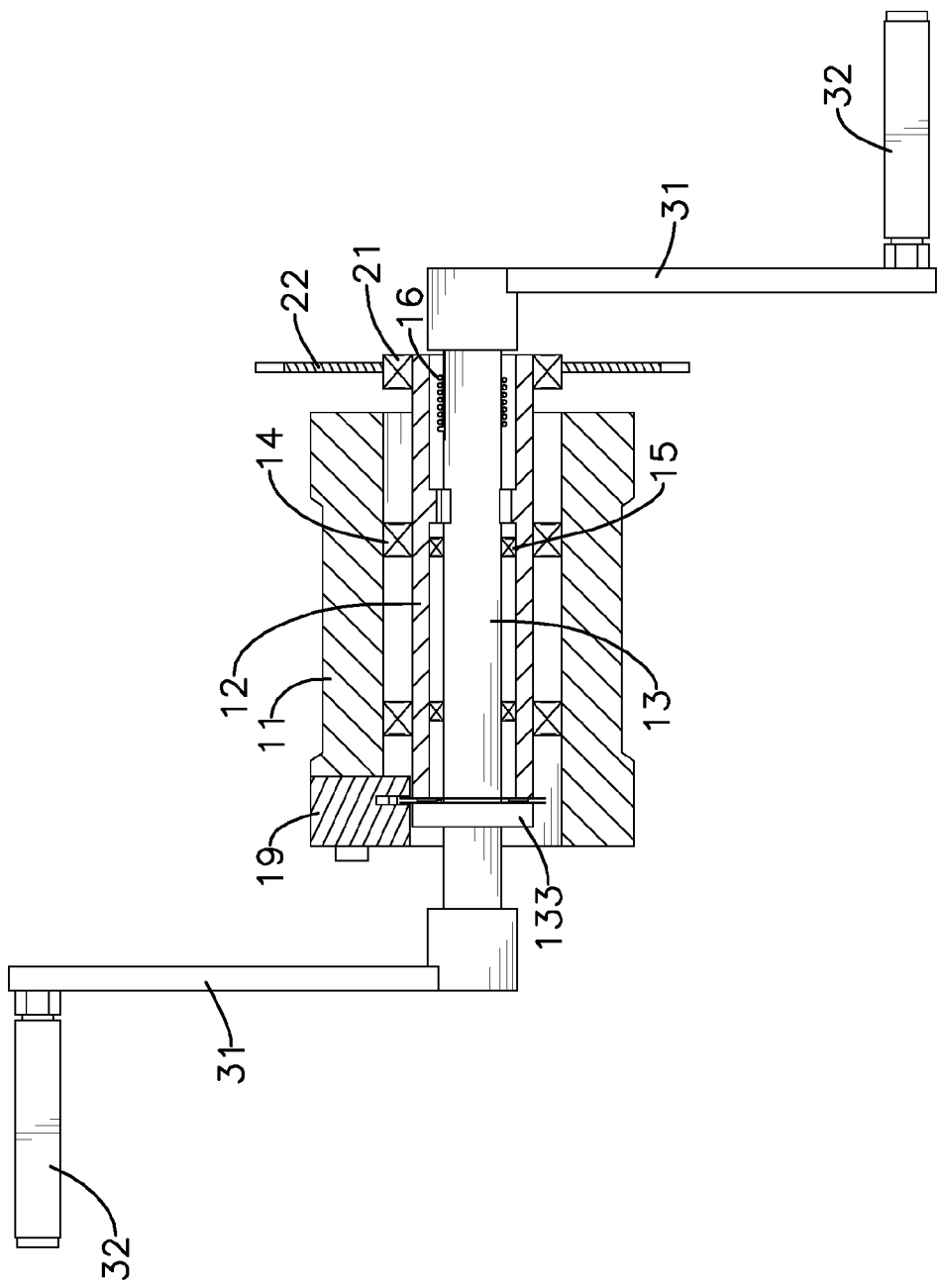
FIG. 6 is a side view in partial section of the torque sensor assembly in FIG. 2.

With further reference to FIG. 6, the middle tube 12, 12A is axially mounted through the envelope tube 11, is coaxial with the envelope tube 11 and has a first end 121, a second end 122, a mounting slot 123, a first stop 124, 124A and a second stop 125, 125A. The mounting slot 123 of the middle tube 12 is formed in the second end 122 of the middle tube 12. The first stop 124, 124A of the middle tube 12, 12A is formed on an inner surface of the middle tube 12, 12A. The second stop 125, 125A of the middle tube 12, 12A is formed on the inner surface of the middle tube 12, 12A and is separated from the first stop 124, 124A of the middle tube 12, 12A.

The transmission axle 13, 13A is axially mounted through the middle tube 12, 12A, is coaxial with the envelope tube 11 and has a first end 131, a second end 132, a mounting ring 133, a first stop 134, 134A, a second stop 135, 135A and a mounting slot 136. The first end 131 of the transmission axle 13 corresponds to the first end 121 of the middle tube 12. The second end 132 of the transmission axle 13 corresponds to the second end 122 of the middle tube 12. The mounting ring 133 is formed around an outer surface of the transmission axle 13, is disposed adjacent to the first end 131 of the transmission axle 13 and has a side surface facing the first end 121 of the middle tube 12.

Figure 5:
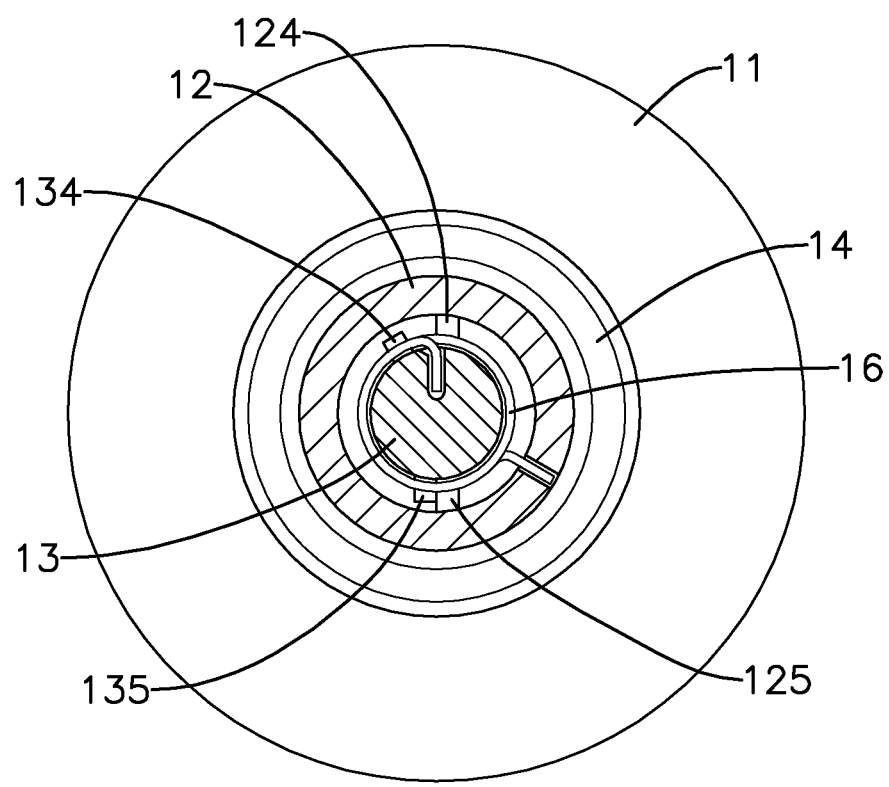
FIG. 5 is an end view in partial section of the torque sensor assembly in FIG. 2.

With further reference to FIG. 5, the first stop 134, 134A of the transmission axle 13, 13A is formed on the outer surface of the transmission axle 13, 13A and is disposed between the first and second stops 124, 124A, 125, 125A of the middle tube 12, 12A. The second stop 135, 135A of the transmission axle 13, 13A is formed on the outer surface of the transmission axle 13, 13A, is separated from the first stop 134, 134A of the transmission axle 13, 13A, is disposed between the first stop 134, 134A of the transmission axle 13, 13A and the second stop 125, 125A of the middle tube 12, 12A.

The mounting slot 136 of the transmission axle 13 is formed in the outer surface of the transmission axle 13 and through the second end 132 of the transmission axle 13.

The at least one outer bearing 14 is mounted around and between the envelope tube 11 and the middle tube 12, and is coaxial with the envelope tube 11. Each of the at least one outer bearing 14 has an outer surface and an inner surface. The outer surface of the outer bearing 14 is attached to an inner surface of the envelope tube 11. The inner surface of the outer bearing 14 is attached to an outer surface of the middle tube 12. Thus, the middle tube 12 and the envelope tube 11 are able to rotate relatively.

The at least one inner bearing 15 is mounted around and between the middle tube 12 and the transmission axle 13, and is coaxial with the transmission axle 13. Each of the at least one inner bearing 15 has an outer surface and an inner surface. The outer surface of the inner bearing 15 is attached to the inner surface of the middle tube 12. The inner surface of the inner bearing 15 is attached to the outer surface of the transmission axle 13. Thus, the transmission axle 13 and the middle tube 12 are able to rotate relatively.

The resilient element 16, 16A is disposed between the middle tube 12, 12A and the transmission axle 13, 13A and has two ends respectively connected to the middle tube 12, 12A and the transmission axle 13, 13A. Thus, the middle tube 12, 12A and the transmission axle 13, 13A has a set relative position under a general condition. When the transmission axle 13, 13A rotates, the transmission axle 13, 13A pushes the resilient element 16, 16A and the middle tube 12, 12A sequentially so the middle tube 12, 12A rotates accordingly.

With reference to FIGS. 4 and 5, the resilient element 16 may be a torsion spring, mounted around the transmission axle 13 and have two ends respectively connected to the middle tube 12 and the transmission axle 13 and respectively mounted through the mounting slots 123, 136 of the middle tube 12 and the transmission axle 13. The first stop 134 of the transmission axle 13 selectively abuts the first stop 124 of the middle tube 12 and the second stop 135 of the transmission axle 13 selectively abuts the second stop 125 of the middle tube 12 when the transmission axle 13 rotates relative to the middle tube 12.

With reference to FIG. 11, the resilient element 16A may be compressible, may be a compression spring, is mounted between the first stops 124A, 134A of the middle tube 12A and the transmission axle 13A and have two ends respectively abutting the first stops 124A, 134A of the middle tube 12A and the transmission axle 13A. The second stop 135A of the transmission axle 13A selectively abuts the second stop 125A of the middle tube 12A when the transmission axle 13A rotates relative to the middle tube 12A.

Figure 7:
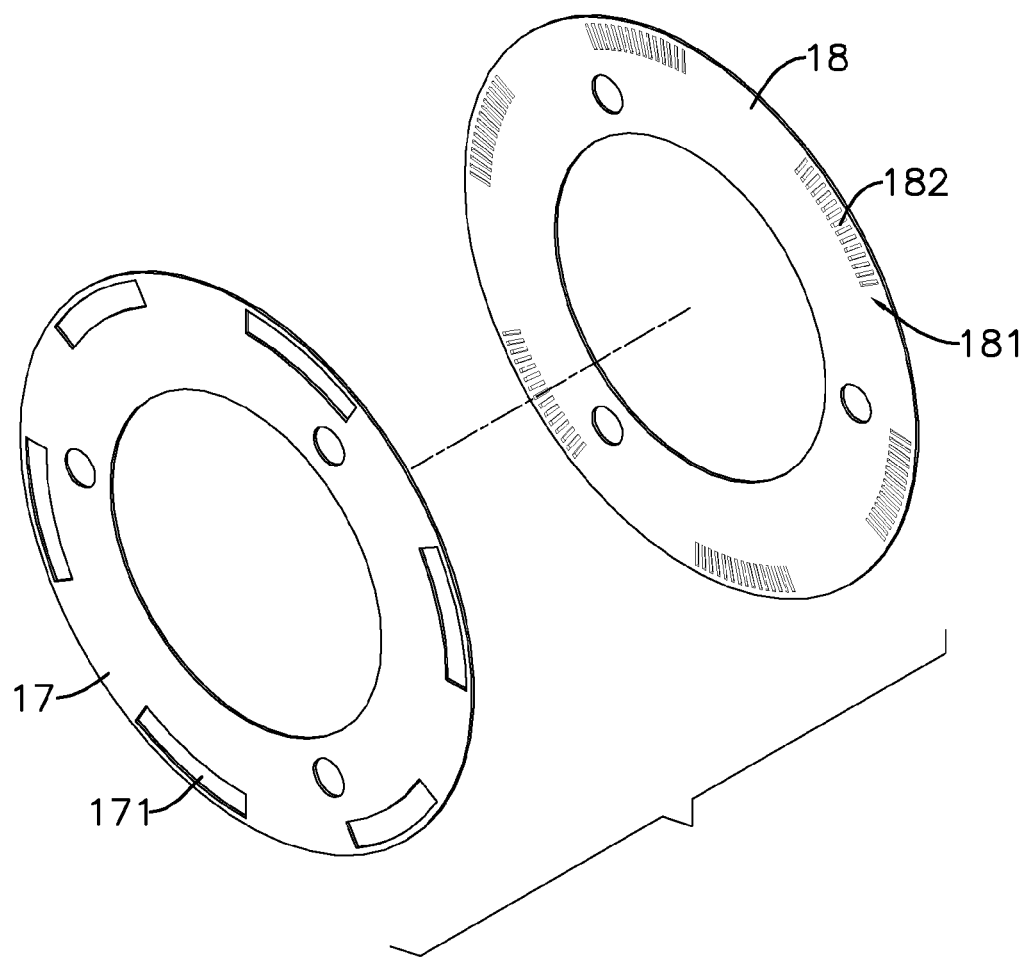
FIG. 7 is an exploded perspective view of a first disc and a second disc of the torque sensor assembly in FIG. 2.
Figure 10:
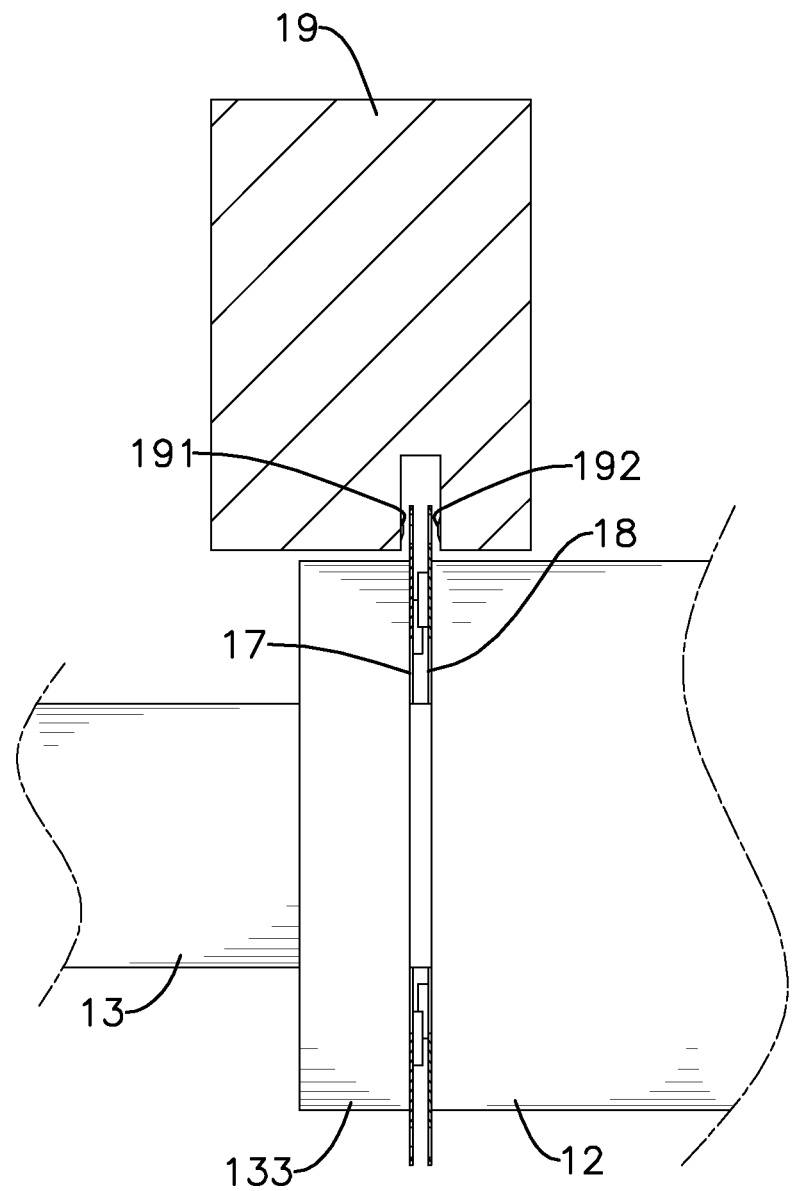
FIG. 10 is an enlarged side view in partial section of the torque sensor assembly in FIG. 1, showing the first disc is a reference disc and the second disc is a mask disc.

With further reference to FIGS. 7 and 10, the first disc is annular, is mounted around the transmission axle 13, is coaxial with the transmission axle 13, is disposed between the mounting ring 133 of the transmission axle 13 and the first end 121 of the middle tube 12 and is attached to the mounting ring 133 of the inner axle 13. The first disc may be a reference disc 17. The reference disc 17 has an outer peripheral edge and multiple through holes 171. The through holes 171 are separately formed through the reference disc 17 and are arranged along the outer peripheral edge of the reference disc 17.

The second disc is annular, is mounted around the transmission axle 13, is coaxial with the transmission axle 13, is disposed adjacent to the first disc and between the mounting ring 133 of the transmission axle 13 and the first end 121 of the middle tube 12 and is attached to the first end 121 of the middle tube 12. The second disc may be a mask disc 18. The mask disc 18 has an outer peripheral edge and multiple detecting portions 181. The detecting portions 181 are separately formed on the mask disc 18 and are arranged along the outer peripheral edge of the mask disc 18. Each detecting portion 181 has multiple detecting grids 182 formed through the mask disc 18 and arranged along the outer peripheral edge of the mask disc 18.

Figure 13:
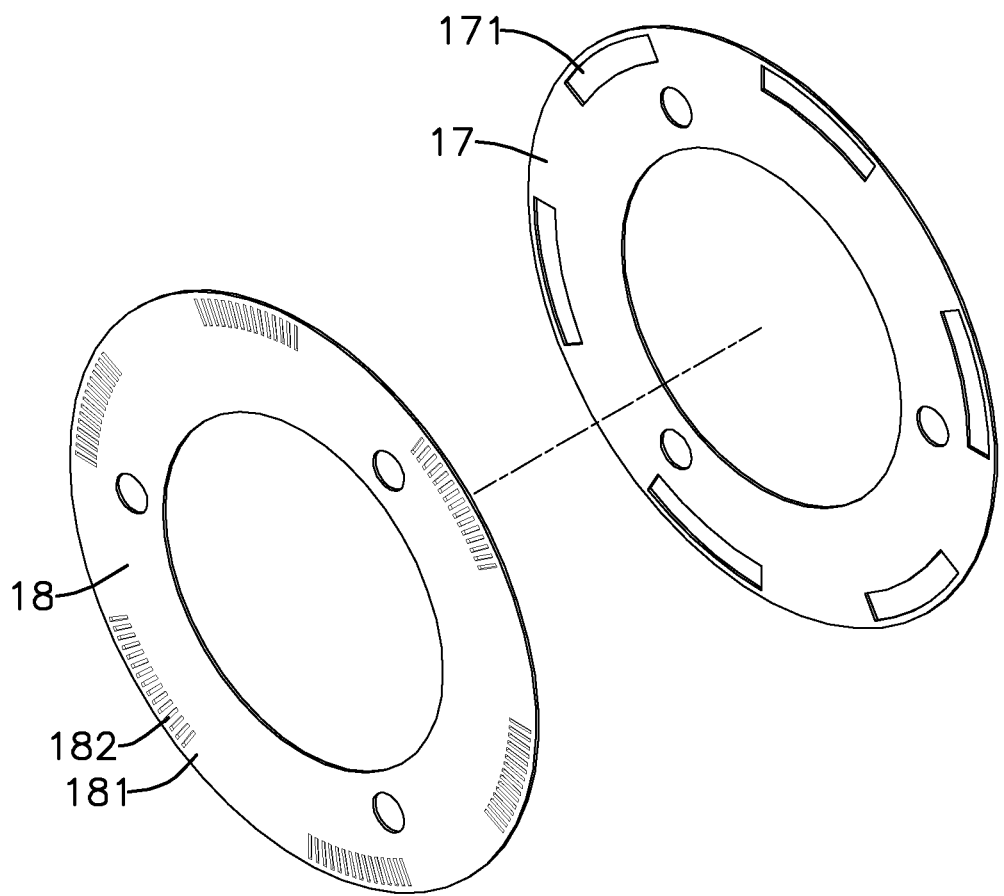
FIG. 13 is an exploded perspective view of a first disc and a second disc of another embodiment of a torque sensor in accordance with the present invention.
Figure 14:
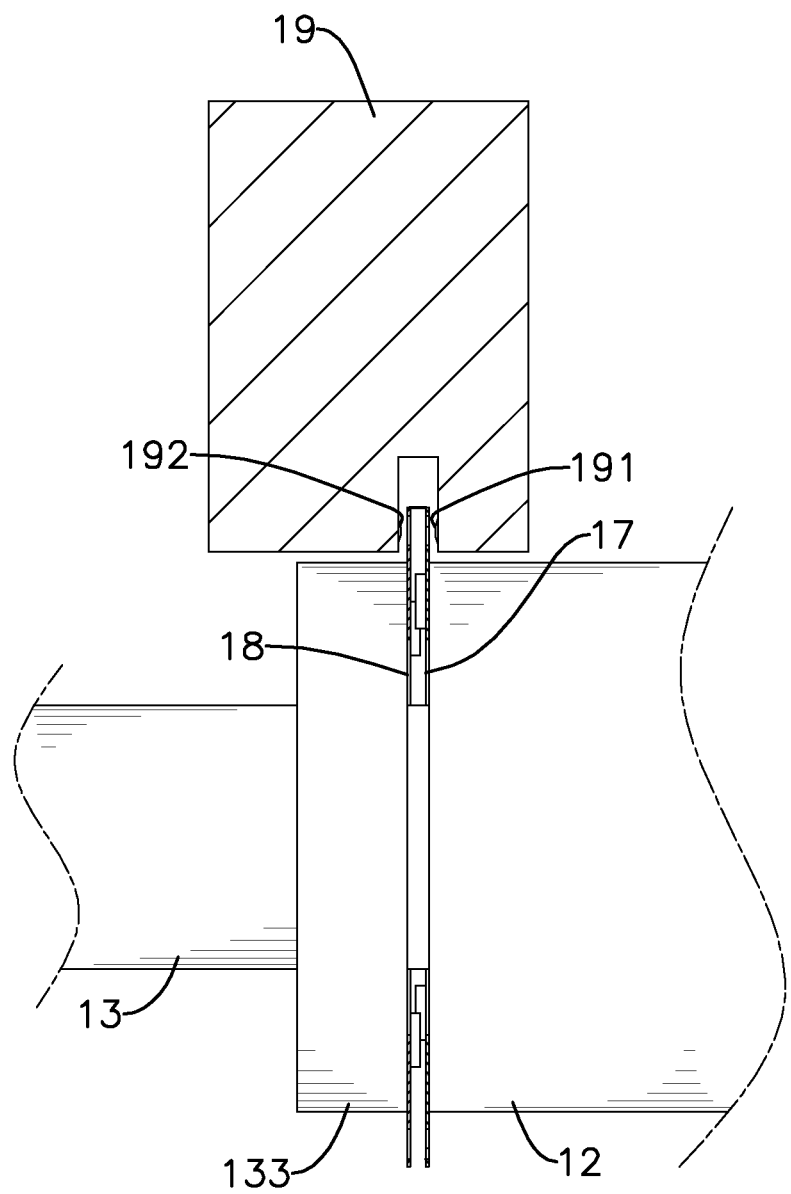
FIG. 14 is an enlarged side view in partial section of the torque sensor in FIG. 1, showing the second disc is a reference disc and the first disc is a mask disc.

Otherwise, with reference to FIGS. 13 and 14, the second disc may be the reference disc 17 and the first disc may be the mask disc 18. Thus, shift angle difference between the first disc and the second disc reflects shift angle difference between the middle tube 12 and the inner axle 13 and deformation of the resilient element 16, 16A.

The detection unit 19 is mounted on the envelope tube 11, detects the shift angle difference between the first disc and the second disc and has a signal emitter 191 and a signal receiver 192. The signal emitter 191 is disposed beside the reference disc 17 and sends signals to selectively pass through at least one of the through holes 171 of the reference disc 17. The signal receiver 192 is disposed beside the mask disc 18, aligns with the signal emitter 191 and selectively receives the signals sent from the signal emitter 191. When the reference disc 17 and the mask disc 18 rotate relative to each other, the signal receiver 192 may receive one signal at a time as small force is applied to the torque sensor 10 or the signal receiver 192 may receive many signals at a time as large force is applied to the torque sensor 10.

The one-way bearing 21 is securely mounted around the second end 122 of the middle tube 12. The chainwheel 22 is securely mounted around the one-way bearing 21 and is used for allowing a chain 41 to be mounted around the chainwheel 22.

The cranks 31 are respectively connected securely to the first end 131 and the second end 132 of the transmission axle 13. Each of the cranks 31 has an inner end 311 and an outer end 312. The inner end 311 of the crank 31 is securely connected to a corresponding end 131, 132 of the transmission axle 13. The pedals 32 are respectively connected rotatably to the outer ends 312 of the cranks 31 and are used for allowing the rider to work the pedals 32 to rotate the cranks 31 and the transmission axle 13.

Figure 12:
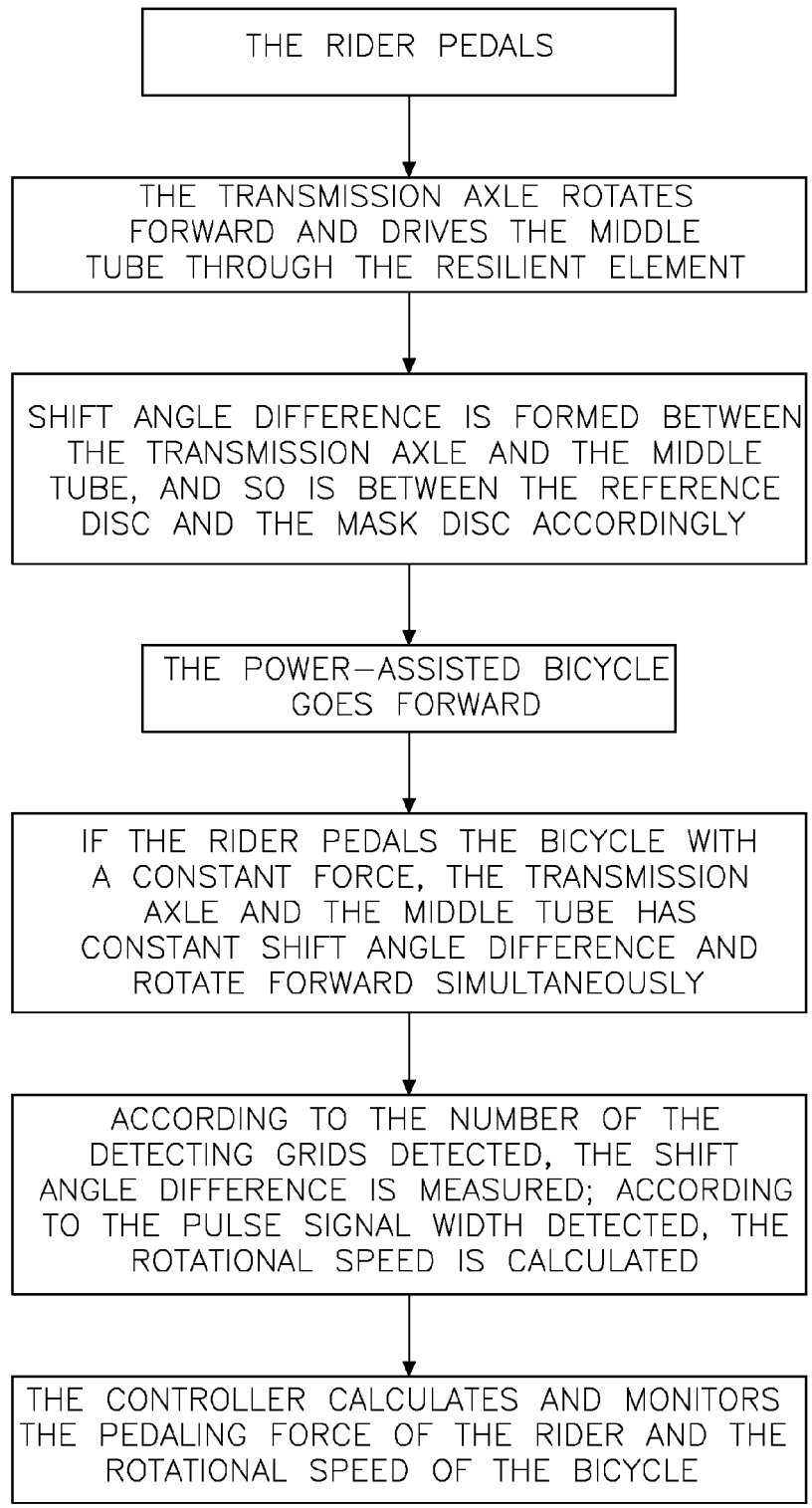
FIG. 12 is an operational flow chart of the torque sensor assembly for FIG. 1.

With further reference to FIG. 12, when the rider works the pedals 32 to rotate the cranks 31 and the transmission axle 13, the transmission axle 13 further pushes the resilient element 16, 16A to rotate the middle tube 12 and the chainwheel 22.

Consequently, the first disc rotates along with the transmission axle 13 and the second disc rotates along with the middle tube 12.

With reference to FIG. 5, when the force applied to the torque sensor 10 reaches a maximum detecting range of the torque sensor 10, the first stops 134, 124 of the transmission axle 13 and the middle tube 12 abut each other. When no force is applied to the torque sensor 10, the resilient element 16 causes the second stops 135, 125 of the transmission axle 13 and the middle tube 12 abut each other.

Figure 8:
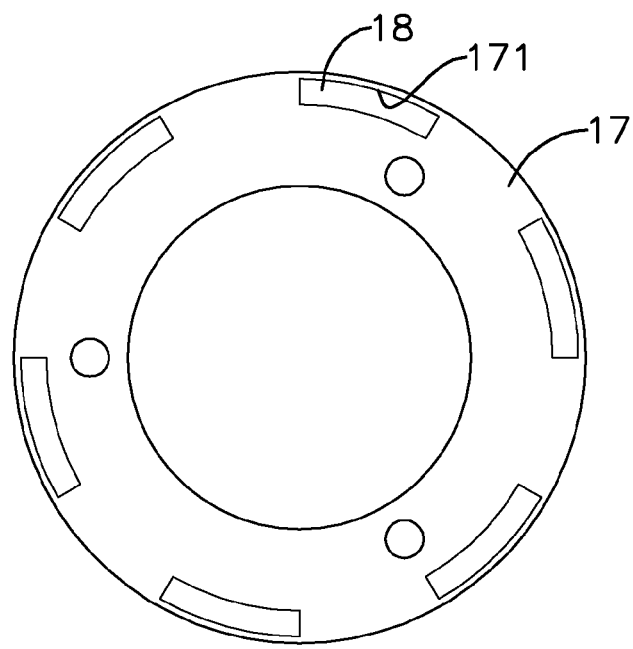
FIG. 8 is a front view of the first disc and the second disc in FIG. 7, shown overlapped.

With further reference to FIG. 8, the detecting portions 181 of the mask disc 18 are respectively disposed between the through holes 171 of the reference disc 17. Thus, under the general condition, the signal receiver 192 of the detection unit 19 does not receive the signal sent from the signal emitter 191.

Figure 9:
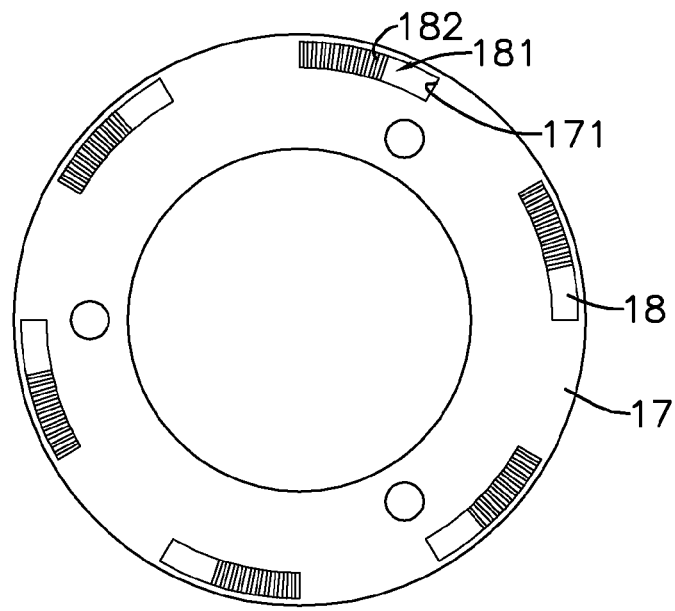
FIG. 9 is an operational front view of the first disc and the second disc in FIG. 7, shown relatively rotated.

With further reference to FIG. 9, when the power-assisted bicycle 40 is riding up on a slope or is about to speed up, the rider has to apply more power to pedal the pedals 32. The resilient element 16, 16A is twisted or compressed. Then, the mask disc 18 rotates relative to the reference disc 17. The detecting portions 181 of the mask disc 18 are respectively revealed in the through holes 171 of the reference disc 17. Thus, the signal receiver 192 of the detection unit 19 receives the signal sent from the signal emitter 191 through the detecting grids 182 of each detecting portion 181. Number of the detecting grids 182 of each detecting portion 181 that are revealed in a corresponding through hole 171 of the reference disc 17 can be counted by counting number of the signals received by the signal receiver 192. Accordingly, an angle by which the mask disc 18 rotates relative to the reference disc 17 and the force that the rider applies are also calculated.

Moreover, according to the angle by which the mask disc 18 rotates relative to the reference disc 17, the detection unit 19 sends a signal to a controller to allow the controller to activate and control an electric motor 42 mounted on the power-assisted bicycle 40 to provide additional torque to the power-assisted bicycle. The electric motor 42 may drive a front wheel 43 or a rear wheel 44 of the power-assisted bicycle 40. Then, the electric motor 42 assists the rider to ride the power-assisted bicycle 40. Therefore, no matter whether the power-assisted bicycle 40 is riding up on a slope or is about to speed up, the rider applies a constant power to the power-assisted bicycle 40, is not tired and achieves a constant exercising effect.

Furthermore, the detecting portions 181 of the mask disc 18 may respectively correspond to the through holes 171 of the reference disc 17. Thus, the detection unit 19 may also detect the angle that the mask disc 18 rotates relative to the reference disc 17.

The torque sensor assembly for the power-assisted bicycle as described has a simple structure, low manufacturing cost, and fast, sensitive and accurate torque sensing ability to detect torque applied by the rider so the electric motor 42 assists the rider to ride the power-assisted bicycle 40 according to the torque. Moreover, the torque sensor assembly can be assembled to all kinds of power-assisted bicycles and is practical.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A torque sensor assembly for a power-assisted bicycle comprising:
    a torque sensor having
        an envelope tube;
        a middle tube axially mounted through the envelope tube and having
            a first stop formed on an inner surface of the middle tube; and
            a second stop formed on the inner surface of the middle tube and separated from the first stop of the middle tube;
        a transmission axle axially mounted through the middle tube and having
            a first stop formed on an outer surface of the transmission axle and disposed between the first and second stops of the middle tube; and
            a second stop formed on the outer surface of the transmission axle, separated from the first stop of the transmission axle, disposed between the first stop of the transmission axle and the second stop of the middle tube and selectively abutting the second stop of the middle tube;
        at least one outer bearing mounted around and between the envelope tube and the middle tube;
        at least one inner bearing mounted around and between the middle tube and the transmission axle;
        a resilient element disposed between the middle tube and the transmission axle and having two ends respectively connected to the middle tube and the transmission axle;
        a first disc being annular, and mounted around and attached to the transmission axle;
        a second disc being annular, mounted around the transmission axle, disposed adjacent to the first disc and attached to the middle tube; and
        a detection unit mounted on the envelope tube and detecting shift angle difference between the first disc and the second disc;
    a one-way bearing securely mounted around one of two ends of the middle tube;
    a chainwheel securely mounted around the one-way bearing;
    two cranks respectively connected securely to two ends of the transmission axle; and
    two pedals respectively connected rotatably to the cranks.

2. The torque sensor assembly as claimed in claim 1, wherein
    the first disc is a reference disc having multiple through holes separately formed through the reference disc and arranged along an outer peripheral edge of the reference disc;
    the second disc is a mask disc having multiple detecting portions separately formed on the mask disc and arranged along an outer peripheral edge of the mask disc, each detecting portion having multiple detecting grids formed through the mask disc and arranged along the outer peripheral edge of the mask disc; and
    the detection unit has
        a signal emitter sending signals to pass through the through holes of the reference disc; and
        a signal receiver selectively receiving the signals sent from the signal emitter.

3. The torque sensor assembly as claimed in claim 1, wherein
    the second disc is a reference disc having multiple through holes separately formed through the reference disc and arranged along an outer peripheral edge of the reference disc;
    the first disc is a mask disc having multiple detecting portions separately formed on the mask disc and arranged along an outer peripheral edge of the mask disc, each detecting portion having multiple detecting grids formed through the mask disc and arranged along the outer peripheral edge of the mask disc; and the detection unit has a signal emitter sending signals to pass through the through holes of the reference disc; and a signal receiver selectively receiving the signals sent from the signal emitter.

4. The torque sensor assembly as claimed in claim 1, wherein the resilient element is a torsion spring mounted around the transmission axle and having two ends respectively connected to the middle tube and the transmission axle.

5. The torque sensor assembly as claimed in claim 2, wherein the resilient element is a torsion spring mounted around the transmission axle and having two ends respectively connected to the middle tube and the transmission axle.

6. The torque sensor assembly as claimed in claim 3, wherein the resilient element is a torsion spring mounted around the transmission axle and having two ends respectively connected to the middle tube and the transmission axle.

7. The torque sensor assembly as claimed in claim 1, wherein the resilient element is compressible and is mounted between the first stops of the middle tube and the transmission axle; and the two ends of the resilient element respectively abut the first stops of the middle tube and the transmission axle.

8. The torque sensor assembly as claimed in claim 2, wherein the resilient element is compressible and is mounted between the first stops of the middle tube and the transmission axle; and the two ends of the resilient element respectively abut the first stops of the middle tube and the transmission axle.

9. The torque sensor assembly as claimed in claim 3, wherein the resilient element is compressible and is mounted between the first stops of the middle tube and the transmission axle; and the two ends of the resilient elements respectively abut the first stops of the middle tube and the transmission axle.

10. The torque sensor assembly as claimed in claim 4, wherein the middle tube further has a mounting slot formed in one of the ends of the middle tube;

the transmission axle further has a mounting slot formed in the outer surface of the transmission axle and through one of the ends of the transmission axle; and the ends of the resilient element are respectively mounted through the mounting slots of the middle tube and the transmission axle.

11. The torque sensor assembly as claimed in claim 5, wherein the middle tube further has a mounting slot formed in one of the ends of the middle tube;

the transmission axle further has a mounting slot formed in the outer surface of the transmission axle and through one of the ends of the transmission axle; and the ends of the resilient element are respectively mounted through the mounting slots of the middle tube and the transmission axle.

12. The torque sensor assembly as claimed in claim 6, wherein the middle tube further has a mounting slot formed in one of the ends of the middle tube;

the transmission axle further has a mounting slot formed in the outer surface of the transmission axle and through one of the ends of the transmission axle; and the ends of the resilient element are respectively mounted through the mounting slots of the middle tube and the transmission axle.

13. The torque sensor assembly as claimed in claim 1, wherein the transmission axle further has a mounting ring formed around the outer surface of the transmission axle and having a side surface facing a corresponding end of the middle tube; and the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

14. The torque sensor assembly as claimed in claim 2, wherein the transmission axle further has a mounting ring formed around the outer surface of the transmission axle and having a side surface facing a corresponding end of the middle tube; and the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

15. The torque sensor assembly as claimed in claim 3, wherein the transmission axle further has a mounting ring formed around the outer surface of the transmission axle and having a side surface facing a corresponding end of the middle tube; and the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

16. The torque sensor assembly as claimed in claim 4, wherein the transmission axle further has a mounting ring formed around the outer surface of the transmission axle and having a side surface facing a corresponding end of the middle tube; and the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

17. The torque sensor assembly as claimed in claim 5, wherein the transmission axle further has a mounting ring formed around the outer surface of the transmission axle and having a side surface facing a corresponding end of the middle tube; and the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

18. The torque sensor assembly as claimed in claim 6, wherein
   the transmission axle further has a mounting ring formed around the outer surface of the transmission axle and having a side surface facing a corresponding end of the middle tube; and
   the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

19. The torque sensor assembly as claimed in claim 7, wherein
   the transmission axle further has a mounting ring formed around the outer surface of the transmission axle and having a side surface facing a corresponding end of the middle tube; and
   the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

20. The torque sensor assembly as claimed in claim 8, wherein
   the transmission axle further has a mounting ring formed around the outer surface of the transmission axle and having a side surface facing a corresponding end of the middle tube; and
   the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

21. The torque sensor assembly as claimed in claim 9, wherein
   the transmission axle further has a mounting ring formed around the outer surface of the transmission axle and having a side surface facing a corresponding end of the middle tube; and
   the first disc and the second disc are disposed between the mounting ring of the transmission axle and the end of the middle tube that corresponds to the mounting ring, and the first disc is attached to the mounting ring of the transmission axle and the second disc is attached to the end of the middle tube that corresponds to the mounting ring.

* * * * *